(12) United States Patent
Yosida

(10) Patent No.: US 6,803,955 B1
(45) Date of Patent: Oct. 12, 2004

(54) IMAGING DEVICE AND IMAGING APPARATUS

(75) Inventor: Hideaki Yosida, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/518,706

(22) Filed: Mar. 3, 2000

(30) Foreign Application Priority Data

Mar. 3, 1999 (JP) ............................................. 11-055939
May 6, 1999 (JP) ............................................. 11-125493

(51) Int. Cl.[7] .......................... H04N 9/083; H04N 1/46; G06K 9/40
(52) U.S. Cl. ........................ 348/272; 348/273; 348/278; 382/260; 358/515
(58) Field of Search ................................ 348/272, 273, 348/278, 277, 276; 382/167, 260; 358/515, 517; 257/440

(56) References Cited

U.S. PATENT DOCUMENTS

| | | | | |
|---|---|---|---|---|
| 4,760,441 A | * | 7/1988 | Kohno ........................ | 348/278 |
| 5,189,407 A | * | 2/1993 | Mano et al. ................... | 345/88 |
| 5,204,948 A | * | 4/1993 | Kato ........................... | 358/520 |
| 5,852,454 A | * | 12/1998 | Kanematsu et al. .......... | 347/43 |
| 5,874,994 A | * | 2/1999 | Xie et al. .................... | 348/349 |
| 5,917,556 A | * | 6/1999 | Katayama ..................... | 348/655 |
| 6,091,850 A | * | 7/2000 | Ostrovsky .................... | 382/166 |
| 6,414,714 B1 | * | 7/2002 | Kurashige et al. ..... | 348/207.99 |
| 6,462,777 B1 | * | 10/2002 | Hamaguri .................... | 348/188 |
| 6,526,181 B1 | * | 2/2003 | Smith et al. ................. | 382/275 |
| 6,618,079 B1 | * | 9/2003 | Higuchi .................... | 348/223.1 |
| 6,618,502 B1 | * | 9/2003 | Okada et al. ............... | 382/167 |

* cited by examiner

*Primary Examiner*—Wendy R. Garber
*Assistant Examiner*—Lin Ye
(74) *Attorney, Agent, or Firm*—Struab & Pokotylo; John C. Pokotylo

(57) ABSTRACT

An imaging device having an imaging pixel array formed as a two-dimensional periodic array of N-pixel (N being 5 or a greater natural number) arrays as unit arrays is disclosed. Also, the color imaging apparatus comprises a CCD imaging device, which have pixels arranged in a 6-color random color coding array. The array meets an array prescription that the pixels adjacent to the four sides and the four corners of a pixel number attention includes pixels of five different colors other than the color of the pixel under attention at least one pixel each. The 6-color random color coding array has six colors with two thereof constituting each of three original colors while being different in sensitivity. The color imaging apparatus further comprises a digital processing circuit for executing a color separating process on output signal of the color imaging device on the basis of the random color coding array, and a memory means constituted by a masked ROM or an EEPROM for storing data concerning the random coding array.

15 Claims, 7 Drawing Sheets

| LR | LG | LB |
|---|---|---|
| DR | DG | DB |
| UNIT ARRANGEMENT || |

| LR | LG | LB | LR | LG | LB |
|---|---|---|---|---|---|
| DR | DG | DB | DR | DG | DB |
| LR | LG | LB | LR | LG | LB |
| DR | DG | DB | DR | DG | DB |
| LR | LG | LB | LR | LG | LB |
| DR | DG | DB | DR | DG | DB |

6×6=64 PIXEL EXAMPLE

| LR | LG | LB |
|----|----|----|
| DR | DG | DB |
| UNIT ARRANGEMENT || |

| LR | LG | LB | LR | LG | LB |
|----|----|----|----|----|----|
| DR | DG | DB | DR | DG | DB |
| LR | LG | LB | LR | LG | LB |
| DR | DG | DB | DR | DG | DB |
| LR | LG | LB | LR | LG | LB |
| DR | DG | DB | DR | DG | DB |
| 6×6=64 PIXEL EXAMPLE ||||||

| R | G | B |
|---|---|---|
| g | W | |

(1) 5 PIXEL

| LR | LG | LB |
|----|----|----|
| DR | DG | DB |
| W  |    |    |

(2) 7 PIXEL

| LYe | LCy | DYe | DCy |
|-----|-----|-----|-----|
| LMg | LG  | DMg | DG  |

(3) 8 PIXEL

| LR | LG | LB |
|----|----|----|
| MR | MG | MB |
| DR | DG | DB |

(4) 9 PIXEL

| G | B |
|---|---|
| R | G |

UNIT ARRANGEMENT

| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |

6×6=64 PIXEL EXAMPLE

| R | G | B |
|---|---|---|
| UNIT ARRANGEMENT ||||

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

6×6=64 PIXEL EXAMPLE

| LB | DB | LG | LR | LG | LR | DG | DR |
|----|----|----|----|----|----|----|----|
| DR | DG | LR | LB | DR | LB | DB | LR |
| LR | LR | DR | DG | DB | LR | LG | LB |
| DB | LB | LG | DB | LG | DG | DR | DG |
| DR | DG | LB | LR | DR | LB | DB | LR |
| LR | LR | DR | DG | LR | DB | LG | LB |
| LB | DB | LG | DB | LG | DG | DR | DB |
| DR | DG | LB | DR | LB | DR | LR | DG |

(A)

| G | B |
|---|---|
| R | G |

(B)

| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |

IMAGING DEVICE AND IMAGING APPARATUS

BACKGROUND OF THE INVENTION

The present invention relates to color imaging device and color imaging apparatus capable of reducing size and cost, and suppressing color moire.

Imaging devices, typically image pick-up tubes and solid-state imaging devices, are extensively used for imaging apparatuses. Particularly, single-tube or single-sensor color imaging devices used for color imaging apparatuses, have a merit that an imaging apparatus can be constructed with a single imaging device. The devices also have many other merits such as no requirement of any color separating prism causing lens size reduction, free from various multiple sensor type adjustments, typically registration, and consume low power. The devices have many contributions to the size and power consumption reduction of imaging apparatuses. Particularly, single-sensor color cameras using color CCD imaging devices which are solid-state devices, have become leading imaging apparatuses.

The above color imaging devices all obtain color information with a single light-receiving surface by color coding therein with color filters called stripes filters or mosaic filters. For example, three, i.e., R, G and B, color filters are applied in a predetermined regular array to each photoelectric converting element, thus providing a peculiar spectral sensitivity to each pixel. Thus, an image signal obtained by imaging a scene contains point-sequential color data corresponding to the predetermined color filter array. It is thus possible to take out color data by separating and taking out the signal corresponding to each color filter in compliance with the predetermined color filter array. To obtain luminance signal (or Y signal), at least three pixels (i.e., one R, one G and one B pixel) are necessary, and this means that the color imaging can be obtained with a single imaging device although the luminance resolution is sacrificed.

RGB Bayer array is one of such well-known arrays as noted above. While several arrays are well known as the Bayer array, FIG. 6 shows a typical one of such arrays. This array is obtained by sequentially arranging a plurality of two-dimensional unit arrays each of four, i.e., 2×2, pixels to fully fill a plane, that is, it is a two-dimensional periodic array of four-pixel, i.e., (2×2)-pixel, unit arrays.

FIG. 7 shows another example of the RGB stripes array. This array is constituted by three color filter stripes (arranged as sequential columns), that is, it is a two-dimensional periodic array of unit arrays each of three, i.e., 3×1, pixels.

Both the above RGB Bayer and RGB stripes arrays use original (RGB) color filters of good color reproducibility. The Bayer array has a feature that the proportions of the R, G and B pixel numbers are set to 1:2:1, that is, an increased density of G pixels which have great contribution to the luminance signal is provided, thus providing an increased luminance resolution. In addition, since the pixels are arranged likewise in the vertical and horizontal directions, the resolutions obtainable in the two directions are alike.

The stripes array has no color coding in the vertical direction, and its luminance resolution in this direction is extremely high (i.e., as high as comparable to the monochromatic case). In addition, since the R, G and B pixel densities are the same, this array features that the color signal-to-noise ratio is good and that the color reproducibility is better than that of the Bayer array.

Although the above Bayer and stripes arrays are excellent as described above, in the usual imaging device no particular consideration is given to the securing of the dynamic range (i.e., luminance reproduction range) of imaging a scene. Therefore, imaging of a scene having a great luminance distribution range from high to low luminance readily results in white missing or blackening.

More specifically, the imaging range is not simply determined by the sole imaging device, but it also depends on the signal processing in the imaging apparatus using the imaging device. More specifically, on the high luminance side the saturation level of the imaging device is a limit, and on the low luminance side the noise level of the imaging device output assembled in the imaging apparatus is a limit. Therefore, it has been impossible to obtain an imaging range which at least exceeds the above range.

A usual imaging device used for constructing an imaging apparatus has a photoelectric conversion characteristic as shown in the graph of FIG. 8. In the graph, the ordinate is taken for the logarithm of the signal level, and the abscissa is taken for the logarithm of the incident light intensity. In the graph, UL represents a high luminance side limit level, and LL represents a low luminance side limit level. The level UL substantially corresponds to the saturation level of the imaging device. The level LL, on the other hand, is not the noise level NL itself, but is determined as a signal level having such a predetermined limit signal-to-noise ratio as to withstand appreciation even in coexistence with noise. The range between the levels UL and LL is the effective luminance range, that is, the difference (UL–LL) between these ranges (on the logarithmic axis) is the imaging range.

The imaging range is in many cases about 5 to 6 EV (30 to 36 dB) although it depends on the design and manufacture of the imaging apparatus, and its further improvement has been desired. However, it has been difficult to further improve the range because of limitations imposed on the improvement of the saturation level of the imaging device and the noise level.

Now, among a variety of color coding patterns, which have been proposed and used in practice as the filter array, are 3-original-color filters such as RGB stripes filters and Bayer type RGB mosaic filters (including various varieties) and complementary color filters such as 4-color, e.g., YeMgCy stripes and YeMgCyw and YeMgCyG, mosaic filters.

The present invention points out essential problems, which are inherent in the electronic structures of the color imaging device (such as picture tube, solid-state imaging device, CCD and other types) and the various kinds of color coding (such as original colors and complementary colors or three colors and four colors), and show means for solving the problems. In the following description, unless particularly noted otherwise, only examples are considered.

Among the prior art color coding arrays, an example of Bayer type RGB arrays will now be described with reference to FIGS. 13(A) and 13(B). As shown in FIG. 13(A), the Bayer type RGB array is constituted by a plurality of unit arrays each of four, i.e., (2×2), pixels. As shown in FIG. 13(B), these unit arrays are sequentially arranged to fill a plane. This array has a feature that the proportions of the R, G and B pixel numbers are set to 1:2:1, that is, an increased density of G pixels which have great contribution to luminance signal is provided for increasing luminance resolution. In addition, since the pixels are arranged likewise in the vertical and horizontal directions, the resolutions obtainable in the two directions are alike, which is different from the stripe filter. The array shown in FIG. 13(B) is constituted by 64, i.e., (8×8), pixels.

However, since the Bayer type array uses a regular array as described above, it poses a significant problem causing false resolution image or so-called color moire due to space sampling based on its array. An intrinsically colorless, i.e., monochromatic, scene will now be considered, which happens to contain a scene portion having a luminance pattern (i.e., white-and-black pattern) of the same period as the period of the array. Assuming that an RG row as one horizontal line of the scene is such that R represents white color and G represents black color, the scene causes the output of a signal, which is equivalent to a signal obtainable from a red scene free from luminance changes, that is, an output of a color which is not intrinsically present is generated. Due to such stripes-like iteral pattern, the false color signal or color moire is generated in a low frequency band by so-called frequency folding-back (or areaging), and it can not therefore be removed even by a subsequent electric filtering process or the like including color band suppression.

Accordingly, the optical system of the prior art single sensor color imaging apparatus essentially includes crystal or like optical low-pass filter for ensuring the image quality. However, such an optical low pass filter imposes a great restriction on the size and cost reduction, and also it nevertheless can not completely eliminate image quality deterioration due to the residual color moire.

Aside from this problem, in the prior art imaging apparatus no particular consideration is given to the securing of the dynamic range (i.e., luminance reproduction range) of imaging a scene. Therefore, a problem has been posed that imaging of a scene having wide luminance distribution range from high to low luminance readily results in white missing or blackening.

More specifically, the imaging range is not simply determined by the sole imaging device, but it also depends on the signal processing in the imaging apparatus using the imaging device. More specifically, on the high luminance side the saturation level of the imaging device is a limit, and on the low luminance side the noise level of the imaging device output assembled in the imaging apparatus is a limit. Therefore, it has been impossible to obtain an imaging range which at least exceeds the above range. A usual imaging device used for constructing an imaging apparatus has a photoelectric conversion characteristic as shown in the graph of FIG. 8.

In the graph, the ordinate is taken for the logarithm of the signal level, and the abscissa is taken for the logarithm of the incident light intensity. In the graph, UL represents a high luminance side limit level, and LL represents a low luminance side limit level. The level UL substantially corresponds to the saturation level of the imaging device. The level LL, on the other hand, is not the noise level itself, but is determined as a signal level having such a predetermined limit signal-to-noise ratio as to withstand appreciation even in coexistence with noise. The range between the levels UL and LL is the effective luminance range, that is, the difference (UL–LL) between these ranges (on the logarithmic axis) is the imaging range.

The imaging dynamic range is in many cases about 5 to 6 EV (30 to 36 dB) although it depends on the design and manufacture of the imaging apparatus, and its further improvement has been desired. However, it has been difficult to further improve the range because of limitations imposed on the improvement of the saturation level of the imaging device and the noise level.

SUMMARY OF THE INVENTION

An object of the present invention is to solve the above problem by the provision of a high image quality imaging apparatus, which features a revolutionally improved imaging range while using an imaging device comparable to the prior art device and basically having the advantages of the prior art stripes array, and an imaging device suited for the same.

Another object of the present invention is to provide an imaging apparatus, which is based on a novel multiple pixel unit array imaging system obtained as a specific means for solving the above problem and having a wide scope of applications, and an imaging device suited for the same.

Other object of the present invention is to improve the imaging dynamic range in the prior art color imaging apparatuses, and to provide an imaging apparatus, which is free from color moire generation even with a scene having a periodic luminance change, permits greatly improving the imaging dynamic range, size and cost reduction and high image quality color imaging, and also a color imaging device permitting the same to be obtained.

According to an aspect of the present invention, there is provided an imaging device having an imaging pixel array formed as a two-dimensional periodic array of N-pixel (N being 5 or a greater natural number) arrays as unit arrays.

According to this invention, it is possible to realize an imaging device is obtainable, which permits various imaging quality improvements that are not obtainable with prior art unit arrays of 4 of less pixels.

Here, N may be 6, and of six, i.e., 1-st to 6-th, pixels constituting each unit array, the 1-st to 3-rd pixels have different color characteristics (i.e., relative spectral sensitivity characteristics), and the 4-th to 6-th pixels are different in the sensitivity (i.e., absolute sensitivity) from and the same in the color characteristic as the 1-st to 3-rd pixels, respectively.

According to this invention, with 6-pixel unit arrays it is possible to very easily realize applications to two-density type unit arrays based on the prior art 3-pixel unit arrays, and it is possible to realize an imaging device, which permits greatly enlarging the imaging range while basically having the features of the prior art 3-pixel unit arrays.

The three different color characteristics are three original colors R, G and B to be additively mixed.

According to this invention, it is possible to realize an imaging device, which permits greatly enlarging the imaging range while basically having the features of the prior art RGB stripes array.

According to another aspect of the present invention, there is provided an imaging apparatus comprising an imaging device having an imaging pixel array formed as a two-dimensional periodic array of unit arrays each constituted by six, i.e., 1-st to 6-th, pixels, the 1-st to 3-rd pixels having different color characteristics (i.e., relative spectral sensitivity characteristics), the 4-th to 6-th pixels being different in the sensitivity (i.e., absolute sensitivity) from and the same in the color characteristic as the 1-st to 3-rd pixels, respectively, and an image signal generating means for generating an image signal having a predetermined form according to 1-st to 6-th pixel data signals obtained in correspondence to the 1-st to 6th pixels in the imaging device, wherein: the different sensitivities of the 1-st and 4-th pixels, as well as the 2-nd and 5-th pixels and the 3-rd and 6-th pixels in the imaging device are set such that the effective luminance range of the 1-st, as well as 2-nd and 3-rd pixel data signals have common range with the 4-th, as well as 5-th and 6-th pixel data signals, respectively.

According to this invention, it is possible to realize a high image quality imaging apparatus, which has a very wide imaging range while providing entirely the same performance as that of an imaging apparatus, which uses a prior art imaging device using 3-pixel unit arrays (for instance an RGB stripes array), for medium luminance range scenes.

The image signal generating means includes a level compensating means for compensating a signal level difference between the 1-st, as well as 2-nd and 3-rd, pixel data signal and the 4-th, as well as 5-th and 6-th, pixel data signal with respect to the same brightness scene.

According to this invention, it is possible to realize a practical imaging apparatus, which can generate image signal by compensating for a pixel sensitivity difference produced in high image quality imaging using the imaging device according to the present invention.

The image signal generating means includes a pixel data extrapolating means for executing, in the case of effective luminance range deviation while data signals of neighbor pixels of different sensitivities and the same color are not deviating the range in the pixel data signal processing, extrapolation with the data signals of the different sensitivity, same color neighbor pixels.

According to this invention, it is possible to realize an imaging apparatus, which has entirely the same performance as an imaging apparatus using a prior art imaging device using 3-pixel unit array (for instance an RGB stripes array) for scenes with only a high or low portion of the luminance range so long as the scenes meet predetermined conditions.

According other aspect of the present invention, there is provided a color imaging device having a pixel group of a plurality of pixels constituted by photoelectric converting elements, wherein the pixels are arranged in a 6-color random color coding array meeting an array prescription that the pixels are arranged in a 6-color random color coding array meeting a requirement that the pixels adjacent to the four sides and the four corners of a pixel under attention includes pixels of five different colors other than the color of the pixel under attention at least one pixel each.

According to this invention, it is possible to realize a color imaging device, which permits imaging a scene with a non-periodic, i.e., random, color coding array and, since it adopts a 6-color random array meeting a requirement that the pixels adjacent to the four sides and the four corners of a pixel under attention includes pixels of five different colors other than the color of a pixel under attention at least one pixel each, is free from color moire generation, can ensure a resolution at a predetermined high level or above over the entire imaging range and can improve the image quality performance and functions.

The 6-color random color coding array has six colors with two thereof constituting each of three original colors while being different in sensitivity.

According to this invention, since the 6-color random array has six colors with two thereof constituting each of the original colors while being different in sensitivity, it is possible to greatly improve the dynamic range of imaging.

According to still other aspect of the present invention, there is provided a color imaging apparatus comprising a color imaging device according to above two invention, and a color separating means for executing a color separating process on output signal of the color imaging device on the basis of the random color coding array of the color imaging device.

According to this invention, it is possible to provide a color imaging apparatus capable of executing reliable color separation according to color coding array data of a color imaging device, which is free from color moire generation, has a sensitivity at a predetermined high level or above, can improve the image quality performance and functions and can greatly improve the dynamic range of imaging.

The color imaging apparatus of the above invention further comprises a memory means for storing array data concerning the random color coding array of the color imaging device, the array data being stored for the execution of the color separating process in the color separating means.

According to this invention, with the provision of the memory means for storing array data concerning the random color coding array of the color imaging device, it is possible to permit ready and reliable color separation according to the random color coding array data.

The memory means is constituted by a masked ROM.

According to this invention, with the provision of the masked ROM as memory means for storing the color coding array data, it is possible to manufacture the memory means, and hence the color imaging apparatus, at low cost and by mass reduction.

The memory means is constituted by an EEPROM.

According to this invention, with the provision of the EEPROM as memory means for storing the color coding array data, it is possible to readily cope with color separating processes of color imaging devices having different color coding arrays.

Other objects and features will be clarified from the following description with reference to attached drawings.

BRIEF DESCRIPTION OF THE DRAWINGS

FIGS. 13(A) 13(B) show a basic array and a whole array of RGB Bayer array.

PREFERRED EMBODIMENTS OF THE INVENTION

Preferred embodiments of the present invention will now be described with reference to the drawings.

Figure 1:
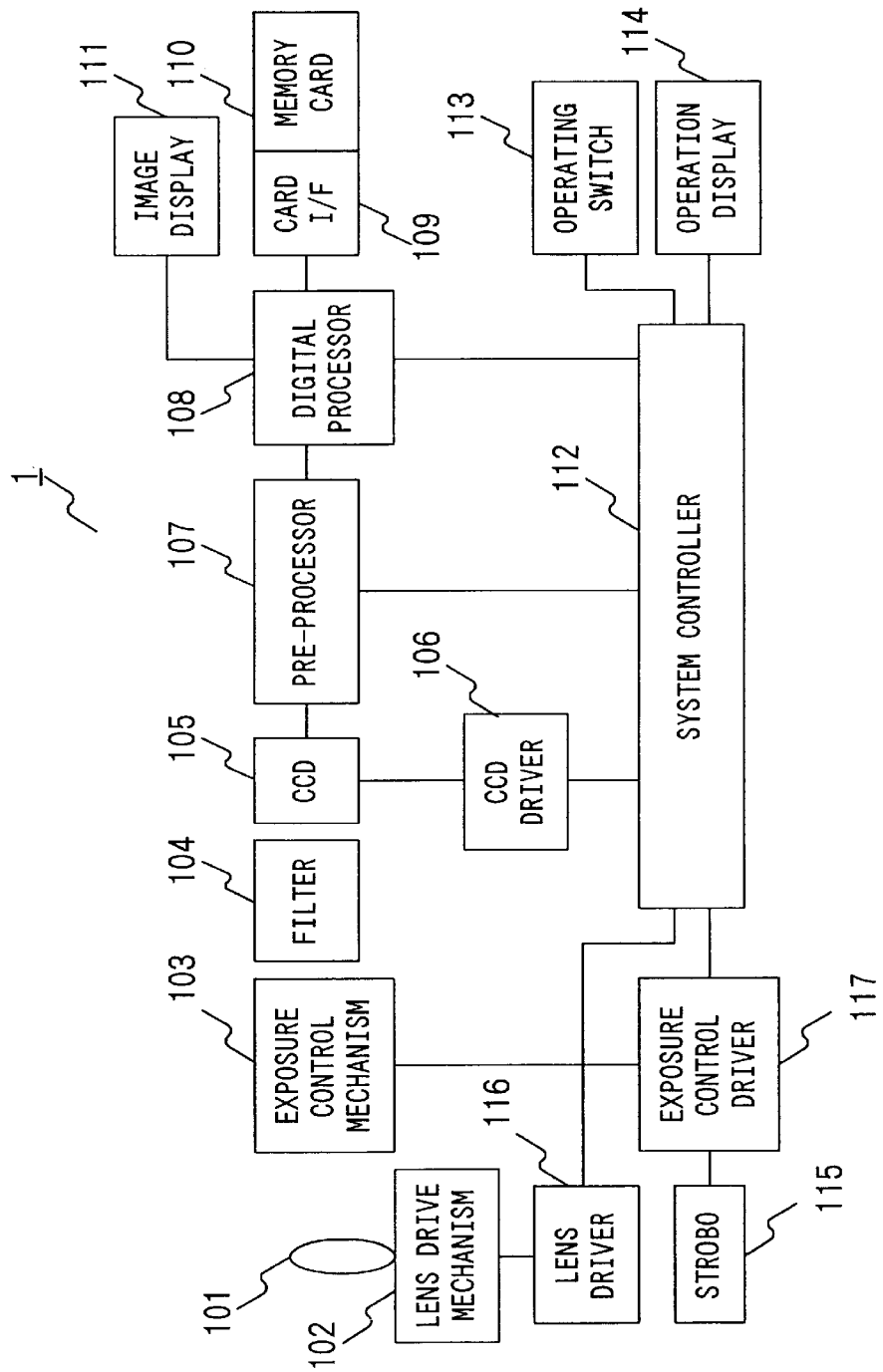
FIG. 1 is a block diagram showing an embodiment of the imaging apparatus according to the present invention.
Figures 2, 3:
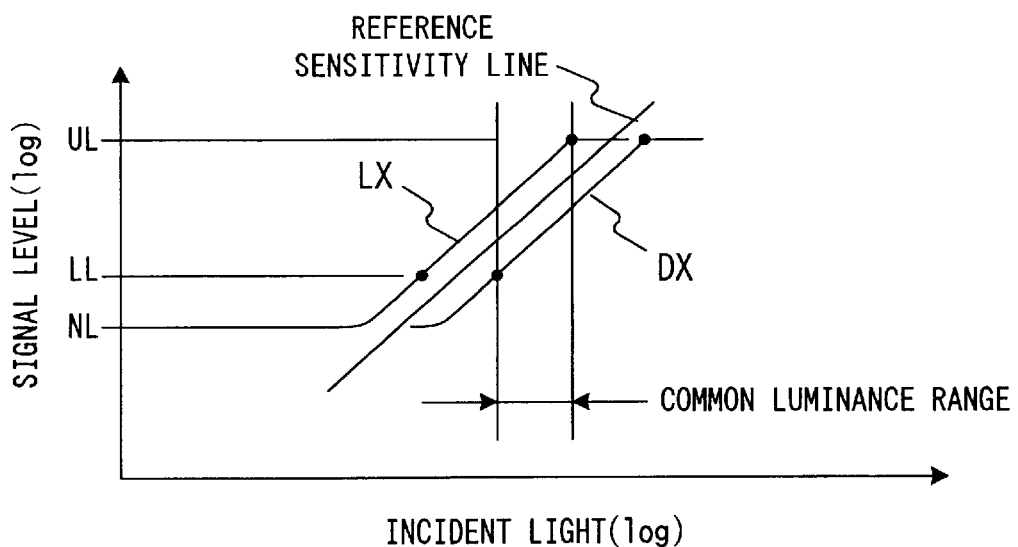
FIG. 2 is a view showing a filter array of the embodiment of the imaging apparatus according to the present invention.
FIG. 3 is a graph showing the characteristics of LX (X representing R, G or B) and DX pixels of imaging device.
Figures 4, 5, 6:
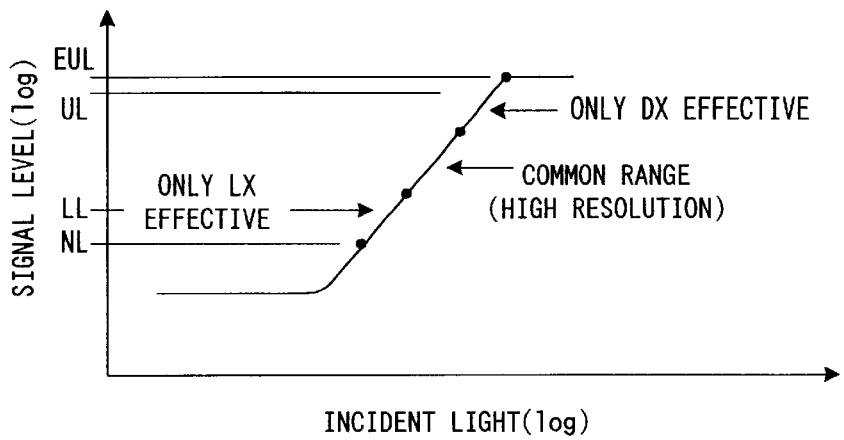
FIG. 4 is a graph showing overall characteristics concerning X signal in the imaging apparatus.
FIG. 5 shows the different categories of unit arrays of the above embodiments.
FIG. 6 shows a typical RGB Bayer array.
Figures 7, 8:
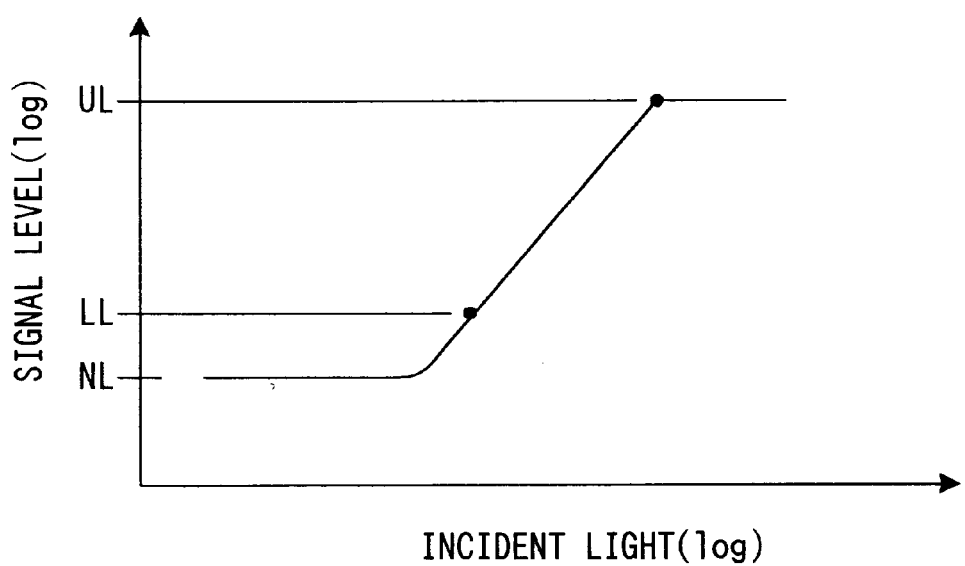
FIG. 7 shows another example of the RGB stripes array.
FIG. 8 shows a photoelectric conversion characteristic of a prior art imaging device.

FIG. 1 is a block diagram showing an embodiment of the imaging apparatus according to the present invention. FIG. 2 is a view showing a filter array of the embodiment of the imaging apparatus according to the present invention. FIG. 3 is a graph showing the characteristics of LX (X representing R, G or B) and DX pixels of imaging device. FIG. 4 is a graph showing overall characteristics concerning X signal in the imaging apparatus.

Referring to FIG. 1, the imaging apparatus 1 comprises an imaging lens system 101 for focusing a scene image, an imaging lens drive mechanism 102 for setting the focal point of the imaging lens on the scene, an exposure control mechanism 103 for obtaining a proper level photographic signal, a filter system 104 for color separation, a CCD 115 serving as an imaging device for generating the photographic signal by converting scene light to an electric signal, a CCD driver 106 for driving the CCD 105, a pre-processor 107 for executing A/D conversion and other processing, a digital processor 108 for executing all digital processing including image signal processing, a card interface 109, a memory card 110 for recording a signal outputted from the digital processor 108 via the card interface 109, an image display system 111 for displaying photographed image and various data, a system controller 112 (including a microcomputer as a main component) for controlling the entire system, an operating switch system 113 for starting the photographing, setting various modes and so forth, an operation display system 114 for displaying the content of operation of the operating switch system 113, a strobo 115 for illuminating the scene with auxiliary light, a lens driver 116 for driving the imaging lens drive mechanism 112, and an exposure control driver 117 for controlling the exposure of the exposure control mechanism 103 and the strobo 115.

FIG. 2 shows a color filter array of the CCD 105. The color filter array comprises filters of the same colors (relative spectral permeabilities) as the R, G and B filters of the prior art Bayer array imaging device, LR, DR, LG, DG, LB and DB representing light red, dark red, light green, dark green, light blue and dark blue, respectively. LX represents double the light permability of X filter, and DX represents one-half the light permeability of X filter.

The imaging apparatus 1 using such CCD 105, like the prior art imaging apparatus, reads out and the processes signal to record the photographed image in the memory card 110 or display the image on the LCD image display system 111. This apparatus 1 is different from the prior art apparatus in the image signal generating process, and it is assumed that the operation other than the operation directly pertaining to the present invention to be described hereinunder, is entirely the same as the operation concerning the well-known RGB stripes array CCD. The image signal generating process is executed by the digital processor 105 under control of the system controller 112.

FIG. 3 shows the characteristic of the imaging apparatus 1 concerning the photoelectric conversion of pixel data signal read out from the imaging device with respect to a noted color X (i.e., LX or DX), that is, either R, G or B, except for inter-color sensitivity difference among the R, G and B colors. The illustrated characteristic is obtainable as a result of horizontal parallel displacement of the prior art X color characteristic by an amount corresponding to filter permeability difference. (The reference sensitivity line as shown is an auxiliary line corresponding to the prior art photoelectric conversion characteristic of X color effective luminance range.)

In the prior art image signal generating process, a color signal generating process (usually called color separating process) is basically a signal extrapolating process using neighbor pixel data or the like concerning a pixel without corresponding color signal (for instance R filter pixel in B signal generating process). More specifically, in this process a continuous color signal is generated from an intermittent color signal directly corresponding to pixel data, which are sequentially outputted from the pixel array of the imaging device. The process is thus also called simultaneous signal generating process. Where a digital process is used as in the embodiment of the present invention, the pixel data signal may once be stored sequentially in the pixel array sequence in a predetermined memory area and used and processed in an approximate extrapolating process to generate three, i.e., R, G and B, simultaneous signals. (If desired, the three signals may once be stored as corresponding three, i.e., R, G and B, images in separate memory areas for being outputted separately.)

In the embodiment of the imaging apparatus 1 according to the present invention, as will be described hereinunder, the color signal generating process, unlike the prior art process, is such that X signal of each X color is generated from two different, i.e., LX and DX, pixel data.

Aside from this, the concept of signal extrapolation concerning the other colors as noted above is the same as in the prior art process. Each X signal generating process is specifically as follows. Y pixel is either one of four pixel other than LX and DX pixels (for instance, when X is G, either one of the LR, DR, LB and DB pixels.)

(1) Process of generating G signal corresponding to LX pixel position:
  ① When the own pixel data signal has a value less than UL (LX), one-half the own pixel data signal value is made to be the X signal value.
  ② When the own pixel data signal is greater than UL (LX), the value of pixel data signal of two DX pixels as the upper and lower neighbors of the own pixel is checked.
  (②-A) When the checked value is greater than LL (DX) and less than DL (DX), double the DX pixel data signal value (or typical one of a plurality, if any, of such values) is made to be the X signal value.
  (②-B) When the checked value is less than LL (DX) or greater than UL (DX), one half the own pixel data signal value is made to be the X signal value.

(2) Process of generating G signal corresponding to DX pixel:
  ① When the own pixel data signal has a value greater than LL (DX), double the own pixel data signal value is made to be the X signal value.
  ② When the own pixel data signal is less than LL (DX), the value of pixel data signal of two LX pixels as the upper and lower neighbors of the own pixel is checked.
  (②-A) When the checked value is greater than LL (LX) and less than UL (LX), one-half the LX pixel data signal value (or typical one of a plurality, if any, of such values) is made to be the X signal value.
  (②-B) When the checked value is less than LL (LX) or greater than UL (LX), double the own pixel data signal value is made to be the X signal value.

(3) Process of generating G signal corresponding to Y pixel position
An X signal value outputted from an X pixel (i.e., ether the sole LX or DX pixel) as the right or left bright of the own pixel is made to be the X signal value of the own pixel.

The "typical value" noted above, among a plurality of signal values, may be obtained by using either a selection method (in which the greater one of the values should always be selected to high resolution, for instance) or an interpolation method (in which an average value is calculated to reduce pseudo signal generation level, for instance).

The color signals obtained as a result of the above color separating process, are converted to the three original color, i.e., R, G and B, simultaneous full pixel signals and, like the prior art three original, i.e., R, G and B, signals, processed in a succeeding circuit to be finally recorded in the memory cartridge 110 or displayed on the LCD image display system 111.

In the above X signal generating process, the case (1)-① or (2)-① has a meaning that when LX and DX are accommodated in a predetermined imaging range (or effective luminance range), their data are directly used. At this time, the sensitivity difference of each pixel from a reference sensitivity corresponding to X in the prior art, is compensated for by multiplying it by a predetermined factor (i.e., by a digital gain control). Thus, with a scene in a range common to LX and DX, it is possible to obtain entirely the same X (i.e., R, G or B) signal as obtainable by imaging with the well-known RGB stripes array can be obtained.

On the other hand, the case (1)-②-(②-A) or (2)-②-(②-A) has a meaning that when the imaging ranges of both LG and DG, are deviated while other neighbor X pixel is not deviating, extrapolation is executed with the other neighbor X pixel free from deviation. That is, with a high or low luminance scene portion covered by the range of only either one of the pixels, X signal is obtained in a status that the vertical pixel density is reduced to one half. This phenomenon, however, takes place only partially, and also the vertical pixel density is not particularly reduced compared to the horizontal pixel density. Thus, the phenomenon does not substantially pose any significant problem.

In this case, taking the prior art X as reference, since the sensitivity is double with LX and one-half with DX, the imaging range is shifted to the low and high luminance sides each by 1 EV (i.e., 6 dB). Thus the imaging range is totally expanded by 2 EV (12 dB). When the dynamic range limit is 6 EV (i.e., 36 dB) in the case of using the prior art imaging device, as an embodiment of the present invention it is possible to obtain an imaging apparatus with a broad dynamic range of 8 EV (i.e., 48 dB). In this case, the common range noted above (in which high resolution is obtainable) is 4 EV, so that the resolution is not reduced in the usual imaging, and is subject to reduction only with highlight portions and shadow portions.

FIG. 4 shows the overall characteristic as described above. The above digital gain control has an effect of causing parallel displacement of the two characteristics and overlap thereof to a single characteristic. EUL and ELL represent the enlarged high and low luminance side limit levels.

Since the dynamic range of each of the R, G and B signals is enlarged, the digital gain control has direct effects on the imaging of the scene, thus greatly enlarging the luminance and chrominance reproduction ranges and also improving the visual color fidelity as a result of signal-to-noise ratio improvement in low luminance range part.

The case (1)-②-(②-B) or (2)-②-(②-B) has a meaning that when both the LG and DG imaging ranges are deviated, the intrinsic pixel data is used directly (i.e., without any gain control). This means that with a scene deviating even enlarged overall range again the intrinsic high resolution can be obtained. With the usual scene no particular effect is obtainable. However, it is possible to prevent resolution reduction with perfectly monochromatic patterns, for instance resolution charts or other special patterns.

In the description so far, the light permeability of each LX pixel is assumed to be double the prior art X pixel light permeability (this being hereinafter referred to as first embodiment), but various other embodiments are conceivable.

Where the peak wavelength light permeability of the prior art X filter is 50% or above, the above first embodiment is infeasible. To cope with this problem, other embodiments will be given under the assumption that the prior art X filter has 100% peak wavelength light permeability.

A second embodiment of the present invention is conceivable, in which the same light permeability as the prior art X filter is set for LX, and one-fourth of this light permeability is set for DX. (This means that the gain compensation values are of course changed correspondingly, and it also applies to the following embodiments). In this case, the imaging range of the X signal is enlarged by 2 EV on the high light luminance side only.

According to the above first and second embodiment, the present invention is obviously readily applicable to various desired values of each X filter peak wavelength light permeability, as well as the mid value between the values in the two embodiments. In the first and second embodiments, the same relative light permeability is set for L and D of each X color (i.e., R, G and B colors). However, it is obvious that different values may be set for each of the R, G and B colors. That is, the present invention is obviously readily applicable to various desired values.

A third embodiment of the present invention is conceivable, in which the level of LL in the first embodiment is reduced to be close or equal to the noise level NL. In this case, the common luminance range, i.e., the high resolution range, can be increased, although this embodiment results in signal-to-noise ratio deterioration and other image quality deterioration in some part of the luminance range compared to the first embodiment. When the level of LL is reduced down to a non-straight portion of the characteristic curve in FIG. 3, this embodiment results in as level difference between the LG and DG pixels in some portion of the luminance range in addition to signal-to-noise deterioration, and this constitutes a new cause of image quality deterioration. This level difference, however, can be removed by means of gain compensation of the DC pixel data signal in such range by taking non-linearity of the characteristic curve into considerations.

In all the above embodiments, the values of the light permeability and so forth are given as examples and can of course be changed as desired. This means that it is possible to obtain trade-off between the effect of range increase and the resolution reduction in some portion of the luminance range.

The nature of the problem solution in the above embodiments of the present invention, is based on two important new concepts. (1) One such concept is the increase of the unit array pixel number, and (2) the other concept is the use of filters of the same color and different densities for obtaining data and generating color signals from the obtained data. The concept (2) has heretofore been attempted in so-called plane-sequential (or time division basis) imaging or multiple sensor imaging, but has not been specifically implemented at the point-sequential pixel array level. This seems to be due to the lack of the concept (1) of increasing the unit array pixel number.

In the prior art, the unit array pixel number for the color coding in a single-sensor imaging device has been at most four from the standpoint of securing resolution. According to the present invention, the new technique of using unit arrays of five or more pixels is introduced. In an embodiment of the present invention (using unit arrays each of six pixels) it has been proved that it is possible to secure a resolution substantially comparable to the resolution obtainable in the prior art (i.e., in the case using 3-pixel unit arrays). The securing of such resolution as to be comparable to that in the prior art is of course not prerequisite, and it is conceivable to derive further important separate effects by allowing resolution deterioration. The new technique of using unit arrays of five or more pixels thus provides great effects in the imaging technique.

More specifically, by using unit arrays each of five or more pixels, it is possible to realize various other embodiments than the above embodiments as follows.

(1) Five pixels: R, G, g, B and W

In this unit array category, g which has narrower band than G and W representing fully transparent filter (i.e., absence of filter) are provided in addition to R, G and B. This unit array category permits improving the green color reproducibility and realizing low contrast coping (i.e., high sensitivity).

(2) Seven pixels: LR, DR, LG, DG, LB, DB and W

In this category, W is provided in addition to the unit array in the previous first embodiment. This category permits enlarging the dynamic range and realizing low contrast coping (i.e., high sensitivity).

(3) Eight pixels: LYe, DYe, LMg, DMg, LCy, DCy, LG and DG

This category permits realizing dynamic range enlarging coping like that in the preceding embodiment with the provision of two different densities of L and D in the case of the prior art array of G and four complementary colors (i.e., Ye, Mg and Cy) or so-called complementary 4-color filter array.

(4) Nine pixels: LR, MR, DR, LG, MG, DG, LB, MB and DB

This category is a development from the preceding two embodiments, and is, three different densities L, M and D are provided for each of the three original colors of R, G and B. The category thus permits realizing further dynamic range enlargement.

FIG. 5 shows the different categories of unit arrays of the above embodiments. (While different arrays can be obtained by interchanging the individual color filters in each unit array, concerning the pattern of the unit array itself, for instance whether the pattern of a 6-pixel unit array is to have a (3×2), a (2×3), a (1×6) or a (6×1) pattern, the same result is obtainable by changing the pattern of periodic arrangement of unit arrays or by interchanging the individual color filters in each unit array. Only one of the different patterns is thus shown for each unit array category.)

As shown above, the present invention can be effectively applied to various filter arrays using various filters. Of course the above embodiments are by no means limitative, and it is possible to use desired filters for color coding using unit arrays each of five or more pixels as desired. The unit array can also have a desired pattern. Furthermore, the color coding may be obtained without use of the so-called optical filter but by varying the spectral characteristic of the structure of the imaging device itself.

As has been described in the foregoing, according to the present invention it is possible to provide a high image quality imaging apparatus, which can greatly improve the basic performance, such as the imaging range, color reproducibility and sensitivity, while using an imaging device comparable to the prior art device and, if desired, basically with the features of the prior art arrays, and an imaging device suited for the same.

Figure 9:
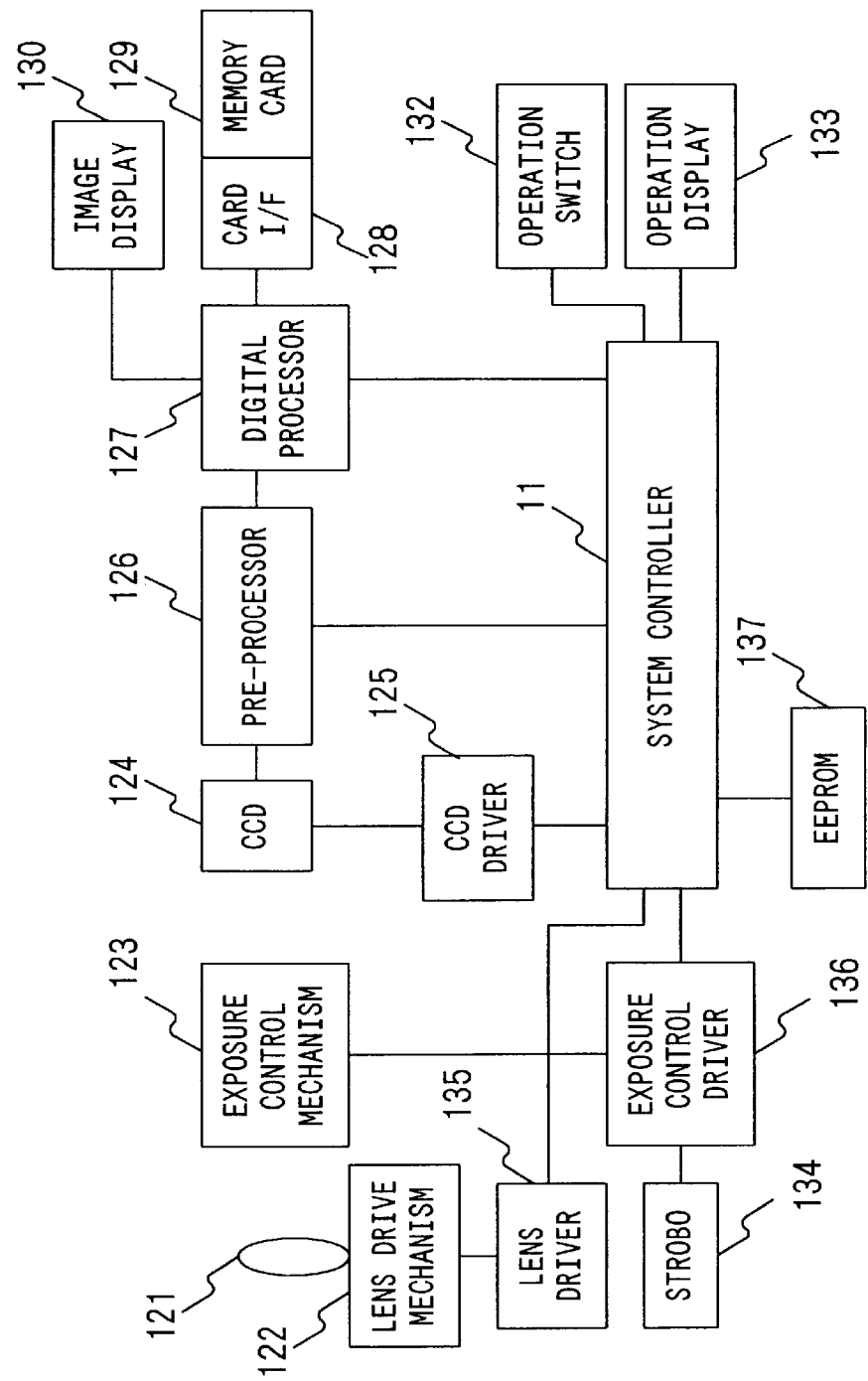
FIG. 9 is a block diagram showing other embodiment of the imaging apparatus according to the present invention.

Now, other embodiment of the present invention will now be described. FIG. 9 is a block diagram showing an embodiment of the color imaging apparatus (i.e., digital camera) using the color imaging device according to the present invention. Referring to the Figure, reference numeral 121 designates a lens system, 122 a lens drive mechanism, 123 an exposure control mechanism, 124 a CCD imaging device, 125 a CCD driver, 126 a pre-processor including an A/D converter, and 127 a digital processor including a memory as hardware for executing all digital processing. Reference numeral 128 designates a memory card interface, 129 a memory card, 130 an LCD image display system, 131 a system controller including a microcomputer as main component, 132 an operating switch system, 133 and operation display system, 134 a strobo, 135 a lens driver, 136 an exposure control driver, and 137 an EEPROM.

Figures 10, 11:
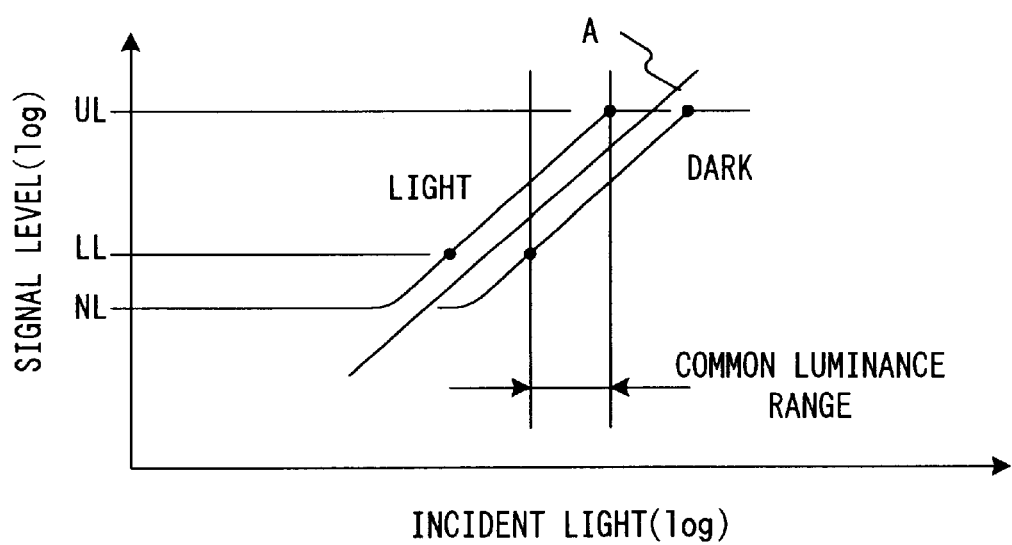
FIG. 10 shows an example of random color filter array of the CCD imaging device used as color imaging device in the embodiment shown in FIG. 9.
FIG. 11 shows a photoelectric conversion characteristic of the pixel data signal read out from the imaging device, concerning X (i.e., LX or DX) color as either of the R, G and B colors under attention.

FIG. 10 shows an example of random color filter array of the CCD imaging device used as color imaging device in the embodiment shown in FIG. 9. The CCD imaging device may be constituted by any desired number of pixels, but it is assumed to be constituted by about one million (1,000,000) pixels. In FIG. 10, only a central portion of the filter array consisting of 64, i.e., (8×8), pixels is shown. A procedure of obtaining such a random array will be specifically described hereinunder. The Figure is provided only for the purpose of assisting the understanding, and sufficient understanding will be obtained with the illustration of this order of area. (Since the random array is an essential subject of the present invention, it is meaningless and also impossible to illustrate the pattern of the entire area.) Labeled LR, DR, LG, DG, LB and DB are light red, dark red, light green, dark green, light blue and dark blue filters. These filters are of the same colors (relative spectral permeabilities) as the R, G and B filters of the prior Bayer type imaging device. LX represents double the light permeability of X filter, and DX represents one-half the light permeability of X filter. (X represents either R, G or B, and this is so in the following description as well.) The color filter coding as shown above is hereinafter referred to as 2-density RGB 6-color (abbreviated 2-density RGB or RGB 6-color) random color coding.

An example of the procedure of obtaining the above random color coding will now be described. Although it is possible to determine the color filters of the individual pixels by using a dice with each side assigned to each of the 2-density RGB 6-color members, to reduce the cumbersomeness of this operation, a table array corresponding to the entire pixel array is prepared by using table calculation software or the like. Then, for numerical figures obtained by assigning formula MOD (RND/6), (Where RND represents a random number function having an appropriate number of digits and MOD (n/d) is a residue function obtained by dividing n by d) to each array cell, such assignment may be made as 0 to LR, 1 to LG, 2 to LB, 3 to DR, 4 to DG and 5 to DB.

The array that is obtained in the above way usually does not have a great statistical deviation. However, what is obtained by only a single trial may, although low in probability, have an extremely large number of pixels of a particular color or concentration of a particular color over a large area. Furthermore, the possibility of resulting in a periodic pattern as in the prior art example is not zero, although it is extremely low. Accordingly, it is desirable to carry out the trial several times in the procedure described above to obtain a plurality of array samples, then carry out imaging experiments by actual imaging (or simulation in actual practice) and then adopt an array having a good result of evaluation.

However, the above trial-wise procedure may be inevitable for the final array selection, having the sole resort to the trial from the outset usually extremely reduces the design efficiency and is therefore undesired. In addition, in the evaluation of the array obtained trial-wise, there must be what can be thought to be an objectively essential prerequisite of the array itself to obtain good imaging quality. (As an extreme example, all pixels obviously should not be of a single color.) It is extremely effective to find out a specific prerequisite such as above and adopt this as a prescriptive requirement (or reference of judgment).

Specifically, the 2-density RGB 6-color random array of the CCD imaging device in the embodiment adopts a prescriptive requirement that the pixels adjacent to the four side or the four corners of a pixel under attention include pixels of five different colors other than the color of the pixel under attention (i.e., own color) at least one pixel each. For example, if the color of the filter of a pixel under attention (i.e., own color) is LR, the eight neighbor pixels adjacent to the upper, lower, left and right sides and the four corners of the pixel under attention include LG, LB, DR, DG and DB pixels at least one pixel each. This requirement is to guarantee that extrapolation with nearest pixel data in a color separating process to be described later is made with neighbor pixel adjacent to either of the upper, lower, left and right sides and the four corners of the pixel under attention and, as a result, guarantee the securing of a resolution at a predetermined high level or above. In the example of FIG. 10, some pixels in each edge line apparently fail to meet the above requirement, but they actually meet the requirement with outer side pixels which are not shown. Actually, the photoelectric conversion face of the imaging device has one to several redundant pixel rows and columns provided on the outside of the four side edges of an effective pixel area, these redundant pixels form a so-called redundant pixel area, which has bearing on the image signal generation although it is not the effective image area.

The array meeting the above requirement is obtainable by preparing a number of perfectly random arrays as noted above in the trial-wise manner and detecting the above requirement or by producing an array generation program provided with the above requirement for software processing, such as table calculations.

In the color imaging apparatus (or digital camera) using the CCD imaging device 124 with such a random color filter array, like the prior art camera, signal is read out and processed to record the photographic image in the memory card 129 or display the image on the LCD image display system 130. The operation is different from that in the prior art in the color separating process, which is executed by the digital processor 127 under control of the system controller 131. The color separating process is of course basically the same as the prior art process so long as it is a signal extrapolation process, using neighbor pixel data or the like, on a pixel providing a signal without any of the neighbor pixel data colors (for instance, R filter pixel in B signal generating process using the prior art RGB filter imaging device). However, while the prior art color separation is carried out by executing regular sampling based on sequence in correspondence to regular color coding of the CCD imaging device and simple extrapolation using a hold circuit or the like, and also inter-pixel addition and subtraction operations if necessary (the specific process being various, covering analog processes, digital processes and combined analog/digital processes), according to the present invention such process can not be carried out because of the lack of any regularity of the random color coding used. Therefore, according to the present invention the color separating process is carried out with reference to filter coding data concerning the individual pixels of the CCD imaging device that is used (i.e., a filter table of all pixels as partly shown as an example in FIG. 10). The filter coding data is stored in the EEPROM 17 and can cope with various types of color coding of the CCD imaging device used.

Aside from the above, it is of course a great difference of the process according to the present invention from the prior art process that two different sensitivity pixels are present for each of the R, G and B colors. When ignoring the sensitivity differences among the R, G and B colors, the photoelectric conversion characteristic of the pixel data signal read out from the imaging device, concerning X (i.e., LX or DX) color as either of the R, G and B colors under attention, is as shown in FIG. 11. That is, the illustrated characteristic is obtained by causing horizontal parallel displacement of the prior art X color characteristic by an amount corresponding to the difference between the light permeabilities of the LX and DX filters. (Reference sensitivity line A shown in FIG. 11 corresponds to the photoelectric conversion characteristic of the effective luminance range of X color in the prior art).

In the color signal generating process in the embodiment of the color imaging apparatus, X signal corresponding to each X color, unlike the prior art case, is generated from two different pixel data, i.e., LX and LD pixel data. Specific X signal generation process is as follows. Y pixel means either of four different pixels other than the LX and DL pixels (for instance either of the LD, DR, LB and DB pixels when X represents G).

LX pixel:
  (1) When the pixel data signal of the own pixel (i.e., pixel under attention) has a value less than UL (LX), one-half the own pixel data signal value is made to be the X signal value.
  (2) When the own pixel data signal is greater than UL (LX), the value of pixel data signal of at least one of DX pixels (at least one being present) adjacent to the own pixel is checked.
    ((2)-A) When the checked DX pixel data signal value (or typical one of more than one, if any, such value) is greater than LL (DX) and less than UL (DX), its double is made to be the X signal value.
    ((2)-B) When all the checked values are less than LL (DX) or greater than UL (DX), one-half the own pixel data signal value is made to be the X signal value.

DX pixel:
  (1) When the own pixel data signal is greater than LL (DX), double the own pixel data signal value is made to be the X signal value.
  (2) When the own pixel data signal is LL (DX), the value of the signal data of at least one of DX signals (at least one being present) adjacent to the one pixel is checked.
    ((2)-A) When the checked DX pixel data signal value (or typical one of more than one, if any, such value) is greater than LL (LX) and less than UL (LX), its one-half is made to be the X signal value.
    ((2)-B) When all checked values are less than LL (LX) or greater than UL (LX), double the own pixel data signal value is made to be the X signal value.

Y pixel:
  Preference is given to the X signal value of an X pixel adjacent to the own pixel (i.e., LX or DX pixel, at least two such pixels being present) (so long as such value meets the above requirement (1)), and the value (or typical one of more than one, if any, such value) is made to be the X signal value of the own pixel.

The "typical value" may be selected among the plurality of signal values noted above by using a selection method (in which the upper pixel rather than the lower pixel and the left pixel rather than the right pixel should always be selected for providing higher resolution, or an interpolation method (in which an average value is calculated to provide a reduced pseudo signal generation level).

The color signals obtained as a result of the above color separating process, are converted to the three original color, i.e., R, G and B, simultaneous full pixel signals and, like the prior art three original, i.e., R, G and B, signals, and processed in a succeeding circuit to be finally recorded in the memory card 128 or displayed on the LCD image display system 130. Among the processes executed in the succeeding circuit are such well-known processes as color balance process, process of conversion to luminance and chrominance difference signals by matrix computation or inverse process, process of removing or reducing false color by bandwidth limitation or the like, various non-linear processes, typically conversion, and various data compression processes.

In the above X signal generation process, the requirement (1) has a meaning that when the LX and DX pixels are covered in a predetermined imaging range (or effective luminance range), their data are directly used. In this case, the sensitivity difference of each pixel from a reference sensitivity corresponding to the sensitivity of X color in the prior art is compensated for by multiplying it by a predetermined factor, i.e., by digital gain control. Thus, with a scene in a range common to LX and DX, a high resolution X (RGB) signal can be obtained with LX and DX functioning as separate X pixels.

On the other hand, the requirement ((2)-A) has a meaning that when the own pixel data signal is deviating the range while other neighbor X pixel is not, extrapolation is executed with the other neighbor X pixel. That is, with a high or low luminance scene part covered by the sole range of either one pixel, X signal is obtained in a one-half pixel density state. The extrapolation in this case is always executed with neighbor pixel. This requirement is the same as the requirement of extrapolation with Y pixel, so that the deterioration of the resolution is extremely slight.

In this case, taking the prior art X as reference, since the sensitivity is double with LX and one-half with DX, the imaging range is shifted to the low and high luminance sides each by 1 EV (i.e., 6 dB). This means a total imaging range enlargement by 2 EV (i.e., 12 dB). When the dynamic range limit is 6 EV (i.e., 36 dB) in the case of using the prior art imaging device, as an embodiment of the present invention unit is possible to obtain an imaging apparatus with a broad dynamic range of 8 EV (i.e., 48 dB).

Figures 12, 13:
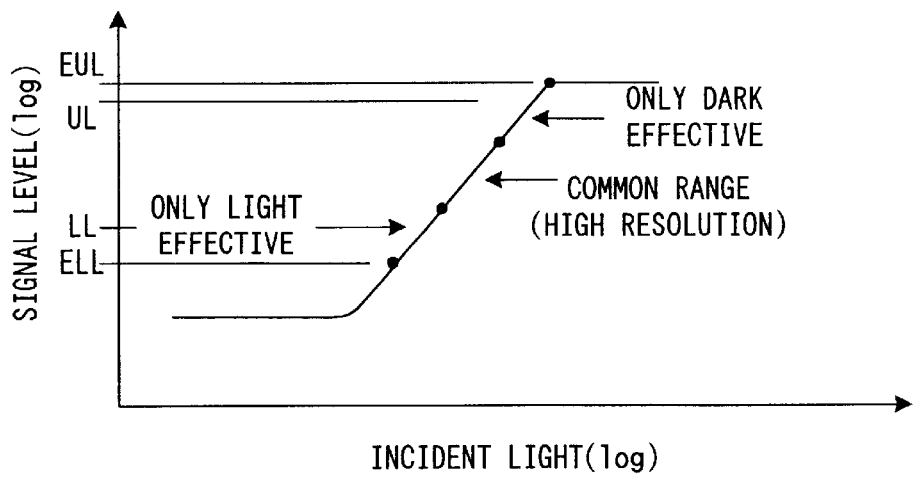
FIG. 12 shows the overall characteristic obtainable by the above color signal generating process.

FIG. 12 shows the overall characteristic obtainable by the above color signal generating process. This overall characteristic is obtainable owing to the effect of the above digital gain control to cause parallel displacement of the two characteristics of LX and DX and overlap thereof to a single characteristic. EUL and ELL represent the enlarged high and low luminance side limit levels.

In this case, although the common range (in which higher resolution is obtainable) is 4 EV, the resolution deterioration has little effect as described above. A modification is thus conceivable, in which the common range is set substantially to zero by changing the light permeability of filters and the factor of the gain control. With such a modification, it is possible to obtain a greatly enlarged imaging dynamic range of 12 EF (i.e., 72 dB).

Since the dynamic range of each of the R, G and B signals is enlarged, the digital gain control has direct effects the imaging of the scene, thus greatly enlarging the luminance and chrominance reproduction ranges and also improving the visual color fidelity as a result of signal- to-noise ratio improvement in low luminance range part.

The requirement ((2)-B) has a meaning that when both the LG and DB imaging ranges are deviated, the intrinsic pixel data is used directly (i.e., without any gain control). This means that with a scene deviating even the enlarged gain (for instance a perfectly monochromatic pattern like a resolution chart), imaging is again possible in a high pixel density state.

Now, false colors generated in the above imaging will be considered. With such scenes as monochromatic knife edges or independent white dots (or lines), like the prior art coding, false colors are naturally generated due to planar color coding. These false colors, however, are all independently generated (false) color dots or lines, and their main energy is distributed in a high frequency band. Thus, these false colors can be removed or reduced by the well-known method such as an electric filtering process. Concerning the imaging of stripes-like iteral patterns posing the most significant problem in the prior art, since the coding is executed randomly, at least low-frequency false color (or color moire) folded back to low frequencies are not generated. In the embodiment, false colors that are generated are only isolated and can be removed or reduced as described before. Thus, in the embodiment substantially no false color giving rise to visual problem is generated without use of any optical low-pass filter which is essential in this type of digital camera, and it is possible to obtain high image quality.

Besides, the extrapolation with the nearest pixel data in the color separating process is always executed with a neighbor pixel adjacent to either of the upper, lower, left and right sides and the four corners of the pixel under attention. Thus, the maximum pixel burr, i.e., the maximum width of PSF (i.e., point image distribution function) is at most three pixels inclusive of an area deviating from the common range with respect to at least the horizontal and vertical directions. Compared to the extrapolation executed with an average value of neighboring pixels rather than one pixel in the color separation with the prior art Bayer type array, it is thus possible to obtain about the same order of resolution with G data and about double resolution with RB data. Besides, with comparison is executed with the sole effect of pure pixel sampling. Since in this case no optical low-pass filter is used, the response is not deteriorated, and it is thus possible to enlarge the resolution up to a frequency band, in which it has heretofore been impossible to obtain resolution.

While one embodiment of the present invention has been described above, various modifications of the embodiment are conceivable. In the above embodiment, the coding data is stored in the EEPROM 17 so as to be able to cope with variations of the coding in the CCD imaging device used. CCD imaging devices are subject to fluctuations when they are manufactured by mass production. To cope with this, the individual imaging devices often require data about missing pixels. The EEPROM has an advantage that it can also serve as a memory for storing such peculiar data. In the meantime, a single kind of imaging apparatus body adopts a single kind of (or the same, by ignoring fluctuations due to the mass production) imaging device. This means that no color coding change is necessary, that is, it is possible to use the same coding data. In this viewpoint, the EEPROM can be replaced with a masked ROM. The masked ROM requires reduced cost for construction. Either memory can of course also serve as a program memory of a microcomputer provided in the system controller 11.

The "procedure for obtaining random coding" described before in connection with the embodiment, is only exemplary, and it is possible to adopt any desired method for the random coding itself. Specifically, the color coding array according to the present invention, unlike the well-known regular array, does not have a pronouncedly regular (or periodic) structure when a predetermined area with at least several to several ten pixels or above is considered. Consequently, an array may have an effect of reducing low frequency false colors compared to a stripes-like iteral pattern input provided by a prior art regular array. Such an array is competent as the random color coding array according to the present invention.

The above embodiment has been described by assuming that the light permeability of each LX filter is soluble the light permeability of the prior art X filter. However, this is unfeasible when the light permeability of the prior art X filter at the peak wavelength is 50% or above. To solve this problem, the following modification is conceivable under the assumption that the prior art X filter peak wavelength light permeability is 100%. Namely, the light permeabilities of the LX and DX filters are set to be the same as and one-fourth the light permeability of the prior art X filter, respectively. (This means that the gain compensation values are of course changed correspondingly, and it also applies to the following cases.) In this case, the imaging range of the X signal is enlarged by 2 EV on the high luminance side only. According to the above embodiment and also this modification, the present invention is obviously readily applicable to various desired values of each X filter peak wavelength light permeability, as well as the mid value between the values in these two cases. In the above embodiment and modification, the same relative light permeability is set for L and D of each X color (i.e., R, G and B colors). However, it is obvious that different values may be set for each of the R, G and B colors. That is, the present invention is obviously readily applicable to various desired values.

In the above embodiment and modification, the light permeability and other values are only exemplary, and can of course be changed as desired.

Furthermore, while the above embodiment and modification adopted the 2-density 6-color random color coding, it is also possible to adopt 2-density YeMgCy 3-original-color random coding using Ye, Mg and CY (commonly called complementary color) filters for the subtractively blended three original colors. It is further possible to simultaneously realize high image quality multiple functions by using six colors, i.e., by using nG (i.e. narrow bandwidth filter) for color reproducibility improvement, W (i.e., no filter) for sensitivity increase and IR (i.e., visible light cut filter) for infrared band imaging in addition to the three original color, i.e., R, G and B, filters. That is, it is possible to adopt desired 6-color coding. Moreover, it is possible to provide color coding without use of so-called optical filters but by varying the spectral characteristics of the structure of the imaging device itself.

As has been described in the foregoing, according to the present invention it is possible to provide a color imaging device and a color imaging apparatus, which can essentially solve the problems inherent in the periodic color coding array, are free from color moire generation even with scenes with periodic luminance changes, can be small in size and manufactured at low cost and permit high quality color imaging.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An imaging device having an imaging pixel array formed as a two-dimensional periodic array of 6-pixel arrays as unit arrays, wherein of the six pixels, arranged from a 1-st pixel to a 6-th pixel, constituting each unit array, the 1-st to 3-rd pixels have different color characteristics, and the 4-th to 6-th pixels are different in the sensitivity from and the same in color characteristic as the 1-st to 3-rd pixels, respectively.

2. The imaging element according to claim 1, wherein the three different color characteristics are three original colors R, G and B to be additively mixed.

3. The imaging device of claim 1 wherein the different color characteristics are relative spectral sensitivity characteristics.

4. The imaging device of claim 1 wherein the sensitivity is an absolute sensitivity.

5. An imaging apparatus comprising an imaging device having an imaging pixel array formed as a two-dimensional periodic array of unit arrays each constituted by six pixels, arranged from a 1-st pixel to a 6-th pixel, the 1-st to 3-rd pixels having different color characteristics, the 4-th to 6-th pixels being different in the sensitivity from and the same in the color characteristic as the 1-st to 3-rd pixels, respectively, and an image signal generating means for generating an image signal having a predetermined form according to the 1-st to 6-th pixel data signals obtained in correspondence to the 1-st to 6-th pixels in the imaging device, wherein:

the different sensitivities of the 1-st and 4-th pixels, as well as the 2-nd and 5-th pixels and the 3-rd and 6-th pixels in the imaging device are set such that the effective luminance range of the 1-st, as well as 2-nd and 3-rd pixel data signals have common range with the 4-th, as well as 5-th and 6-th pixel data signals, respectively.

6. The imaging apparatus according to claim 5, wherein the image signal generating means includes a level compensating means for compensating a signal level difference between the 1-st, as well as 2-nd and 3-rd, pixel data signal and the 4-th, as well as 5-th and 6-th, pixel data signal with respect to the same brightness scene.

7. The imaging apparatus according to claim 5, wherein the image signal generating means includes a pixel data extrapolating means for executing, in the case of effective luminance range deviation while data signals of neighbor pixels of different sensitivities and the same color are not deviating the range in the pixel data signal processing, extrapolation with the data signals of the different sensitivity, same color neighbor pixels.

8. The imaging apparatus of claim 5 wherein the different color characteristics are relative spectral sensitivity characteristics.

9. The imaging apparatus of claim 5 wherein the sensitivity is an absolute sensitivity.

10. A color imaging device having a pixel group of a plurality of pixels constituted by photoelectric converting elements, wherein the pixels are arranged in a 6-color random color coding array meeting an array prescription that the pixels are arranged in a 6-color random color coding array meeting a requirement that the pixels adjacent to the four sides and the four corners of a pixel under attention includes pixels of five different colors other than the color of the pixel under attention at least one pixel each.

11. The color imaging device according to claim 10, wherein the 6-color random color coding array has six colors with two thereof constituting each of three original colors while being different in sensitivity.

12. A color imaging apparatus comprising a color imaging device according to claim 10, and further comprising a color separating means for executing a color separating process on output signal of the color imaging device based on the random color coding array of the color imaging device.

13. The color imaging apparatus according to claim 12, which further comprises a memory means for storing array data concerning the random color coding array of the color imaging device, the array data being stored for the execution of the color separating process in the color separating means.

14. The color imaging apparatus according to claim 13, wherein the memory means is constituted by a masked ROM.

15. The color imaging apparatus according to claim 13, wherein the memory means is constituted by an EEPROM.

* * * * *